United States Patent
Demirkol et al.

(10) Patent No.: US 10,024,376 B2
(45) Date of Patent: Jul. 17, 2018

(54) BRAKE-LINING RETAINER, IN PARTICULAR FOR WHEEL BRAKE DISKS OF RAIL VEHICLES

(71) Applicant: Faiveley Transport Witten GmbH, Witten (DE)

(72) Inventors: Musa Kerim Demirkol, Duisburg (DE); Andreas Mehlan, Unna (DE); Philipp Imhof, Wermelskirchen (DE)

(73) Assignee: Faiveley Transport Witten GmbH, Witten (DE)

( * ) Notice: Subject to any disclaimer, the term of this patent is extended or adjusted under 35 U.S.C. 154(b) by 0 days.

(21) Appl. No.: 15/302,302

(22) PCT Filed: Apr. 14, 2015

(86) PCT No.: PCT/EP2015/058018
§ 371 (c)(1),
(2) Date: Oct. 6, 2016

(87) PCT Pub. No.: WO2015/158685
PCT Pub. Date: Oct. 22, 2015

(65) Prior Publication Data
US 2017/0058978 A1  Mar. 2, 2017

(30) Foreign Application Priority Data

Apr. 16, 2014  (DE) .................... 20 2014 101 811 U (51) Int. Cl.
*F16D 65/095* (2006.01)
*F16D 65/092* (2006.01)
(Continued)

(52) U.S. Cl.
CPC ............ *F16D 65/095* (2013.01); *B61H 5/00* (2013.01); *F16D 55/00* (2013.01); *F16D 65/092* (2013.01);
(Continued)

(58) Field of Classification Search
CPC ...... F16D 65/092; F16D 65/095; F16D 55/00; F16D 55/22; F16D 69/00; F16D 2055/0004; F16D 2055/0008
(Continued)

(56) References Cited

U.S. PATENT DOCUMENTS 2,504,712 A * 4/1950 Mann ................. B61H 5/00
188/244
2,861,654 A * 11/1958 Dean ................. B61H 5/00
188/206 R
(Continued)

FOREIGN PATENT DOCUMENTS

DE   2631149 A1   1/1978
DE   2841139 A1   4/1980
(Continued)

OTHER PUBLICATIONS

International Preliminary Report on Patentability for the International application No. PCT/EP2015/058018 dated Oct. 18, 2016.
(Continued)

*Primary Examiner* — Thomas J Williams
(74) *Attorney, Agent, or Firm* — Kelly & Kelley, LLP (57) ABSTRACT

A brake-lining retainer, in particular for wheel brake disks of rail vehicles, including a retaining part and a closure bar is provided. The brake-lining retainer has a lock which can be displaced in the direction of a longitudinal axis (L) of the lock. The closure bar is arranged on the retaining part in such a way that the closure bar can be pivoted about an axis between a closure position and an opening position, and in that the closure bar has a receptacle for the lock, wherein in the closure position of the closure bar, by displacement of the lock in the direction of the longitudinal axis (L), at least
(Continued)

a segment of the lock can be arranged in the receptacle in such a way that the closure bar can be locked in the closure position.

18 Claims, 8 Drawing Sheets

(51) Int. Cl.
    *B61H 5/00*     (2006.01)
    *F16D 55/00*     (2006.01)
    *F16D 69/00*     (2006.01)
    *F16D 55/22*     (2006.01)

(52) U.S. Cl.
    CPC .............. *F16D 69/00* (2013.01); *F16D 55/22* (2013.01); *F16D 2055/0008* (2013.01)

(58) Field of Classification Search
    USPC ......... 188/73.31, 73.32, 234, 242, 243, 244, 188/246, 250 B, 250 D, 250 F, 250 R
    See application file for complete search history.

(56) References Cited

U.S. PATENT DOCUMENTS 4,271,936 A * 6/1981 Xaver .................. F16D 65/092
    188/234

4,343,382 A     8/1982 Ottewell
8,689,949 B2 * 4/2014 Mosbach .............. F16D 65/092
    188/234

FOREIGN PATENT DOCUMENTS

| | | |
|---|---|---|
| DE | 8518614 U1 | 8/1985 |
| DE | 3417600 A1 | 11/1985 |
| DE | 3515157 A1 | 11/1986 |
| DE | 3643333 A1 | 7/1987 |
| EP | 0226816 A1 | 7/1987 |
| FR | 2367220 A1 | 5/1978 |
| FR | 2687441 A1 | 8/1993 |
| GB | 1578796 A | 11/1980 |
| GB | 1578796 A * 11/1980 | ........... F16D 65/092 |
| GB | 2174773 A * 11/1986 | ........... F16D 65/092 |
| GB | 2177766 A | 1/1987 |
| GB | 2186334 A | 8/1987 |
| WO | 99/45291 A1 | 9/1999 |

OTHER PUBLICATIONS

International Search Report for International Application No. PCT/EP2015/058018 dated Oct. 16, 2015.
German Search Report for German Application No. DE202014101811.5 dated Dec. 9, 2014.

* cited by examiner

BRAKE-LINING RETAINER, IN PARTICULAR FOR WHEEL BRAKE DISKS OF RAIL VEHICLES

FIELD OF THE INVENTION

The invention relates to a brake-lining retainer, in particular for wheel brake disks of rail vehicles, comprising a retaining part and a closure bar.

BACKGROUND OF THE INVENTION

Brake-lining retainers are used inter alia for brake disks of rail vehicles. Usually a force is applied on the brake-lining retainer via a brake linkage, so that there is a frictional engagement between the brake lining and the brake disk of the rail vehicle. The braking force generated thereby results in a slowdown of the rail vehicle.

Due to relative movements of the brake linkage to the bogie of the rail vehicle and the resulting brake load of the wheel brake disks, collisions at the brake linkage between the wheel retainer and the lining retainer occur with known brake-lining retainers. To secure the brake lining against loss during operation, a closure bar is arranged at the retaining part of the brake-lining retainer.

PRIOR ART

From EP 0 226 816 A1, a brake-lining retainer for rail vehicles is known in which a pivotable cross-bar is provided, which in closure position fixes a brake lining inserted into the lining retainer. In closure position, the cross-bar is located in blocking position in front of the brake lining inserted into the lining guide of the lining retainer. At the side of the cross-bar which is positioned opposite to the brake lining, an eccentric device is provided, by means of which the cross-bar can be clamped in the direction of the brake lining.

WO 99/45 291 A1 discloses a brake-ling retainer, in particular for rail vehicles. The brake-lining retainer provides a lining retainer, which at its two longitudinal sides is encompassed by guiding profiles of a brake plate carrying the friction lining. At one of the front ends of the lining retainer a bolt is provided, which is perpendicularly slidable to the lining retainer, which, if spring tension is applied and if the brake plate is slid onto the lining retainer, can extend through an opening provided at the brake plate in such a way that the brake plate is immovably locked at the lining retainer by this single bolt.

In brake-lining retainers known from the prior art, collisions at the brake linkage between the wheel retainer and the lining retainer occur due to relative movements of the brake linkage to the bogie of a rail vehicle as well as the brake load of the wheel brake disks. Further, the exchange of the brake lining retained in the brake-lining retainer is often complicated and requires either the use of a special tool or several steps that could not be performed one-handed.

SUMMARY OF THE INVENTION

The invention is based on the object to provide a brake-lining retainer comprising a closure bar, which is free of collisions with the wheel contour in all specified operating conditions, and which in particular enables the closure bar of the brake-lining retainer to be opened and closed with a standard tool by means of a one-handed operation.

To achieve this object according to the invention it is suggested for a brake-lining retainer, in particular for wheel brake disks of rail vehicles comprising a retaining part and a closure bar, that the brake-lining retainer has a locking means, wherein the locking means is movable in the direction of the longitudinal axis of the locking means, that the closure bar is arranged pivotably at the retaining part about an axis between a closure position and an opening position, that the closure bar has a locking means receptacle, wherein, in the closure position of the closure bar, by moving the locking means in the direction of the longitudinal axis of the locking means at least a section of the locking means can be arranged in the locking-means receptacle in such a way that the closure bar is lockable in the closure position.

The brake-lining retainer according to the invention is designed for disk brakes or wheel brake disks of rail vehicles, and in particular is designed as a two-part lining retainer. At the retaining part of the brake-lining retainer, a brake lining, preferably a back plate of a brake lining, can be arranged. By pivoting the closure bar arranged at the retaining part from an opening position into a closure position, the brake lining is secured against loss in operation. For this purpose, it may be preferably provided that the brake lining or the back plate of the brake lining rests against a region of the closure bar, and in particular is secured against loss by a positive contact with the closure bar. Advantageously, a locking means is provided, which preferably has an elongated shape. The locking means can be moved in the direction of the longitudinal axis of the locking means and in the closure position of the closure bar can be arranged in the locking-means receptacle provided at the closure bar at least with a segment of the locking means, so that a pivoting of the closure bar from the closure position into an opening position is prevented in particular by a positive connection. Thus, according to the invention the closure bar is locked in the closure position, wherein for this purpose the locking means is merely moved along the longitudinal axis of the locking means after the closure bar has been pivoted into the closure position. Due to the special design of the locking means and the locking-means receptacle in the closure bar, a one-handed operation of the closure bar for opening and closing is possible.

Advantageously, the retaining part of the brake-lining retainer serves to receive the brake lining and to transmit the braking force via a linkage, in particular a brake linkage, to the wheel brake disk or to the disk brake of the track wheel. The brake-lining retainer and in particular the retaining part of the brake-lining retainer have an approximately elongated design. The connecting point to the closure bar is located in the lower part of the retaining part of the brake-lining retainer, wherein the lower area of the brake-lining retainer or the retaining part is preferably determined by arrangement of the brake-lining retainer at a wheel brake disk or a disk brake of a track wheel. Thus, when the brake-lining retainer is arranged at a track wheel, the closure bar is located in a lower area of the brake-lining retainer or the retaining part, seen in a vertical direction.

Advantageous embodiments of the invention are characterized in the subclaims.

In an advantageous embodiment of the brake-lining retainer it is provided that the locking means is a bolt, and/or that the locking-means receptacle is a blind hole.

The locking means designed as a bolt can thus be conveniently moved in the direction of the longitudinal axis of the bolt and, by a movement in the direction of the longitudinal axis of the bolt, with at least a segment of the bolt can be arranged in a locking-means receptacle which is arranged in the closure bar and is preferably designed as a blind hole, so that the closure bar is locked in the closure position. The provision of a bolt as a locking means is therefore in particular advantageous, as a simple displacement of the bolt is made possible. Moreover, bolts with a preferably circular cross-section are particularly stable, so that the locking of the closure bar caused by the bolt withstands greater forces and stresses and the brake lining is thus secured under all operating conditions. Furthermore, the provision of a bolt allows a cost-efficient configuration of the brake-lining retainer. Advantageously, a blind hole is provided as a locking-means receptacle at the closure bar. Again, the advantage is achieved by the simple practicability or by the simple arrangement of a blind hole in a closure bar. In addition, a secure locking of the closure bar in the closure position is provided by arranging the bolt in the blind hole.

Preferably the retaining part and the closure bar of the brake-lining retainer are produced in a casting or forging process and further preferably they are mechanically processed for fulfilling the respective function. For the retaining part and the closure part of the brake-lining retainer, standard materials may be used. The standard materials EN-GJS-400-18LT and S355J0 are particularly preferred.

The locking-means receptacle or the locking-means receptacle formed as a blind hole can be formed already during the primary forming process of the closure bar. However, it is also possible that the locking-means receptacle or the bolt is subsequently produced after the primary forming process by means of mechanical processing, such as by setting a hole into the closure bar. In this case, the blind hole may also be referred to as a blind bore.

In a further preferred embodiment of the brake-lining retainer it is provided that the brake-lining retainer has a spring means, in particular a spring, and that the locking means is spring-loaded by the spring means.

By the spring tension of the spring means, the locking means is held in the locking-means receptacle in the closure position. This prevents that the locking means can be pushed out of the locking-means receptacle under operating conditions because of the occurring forces and loads.

If the locking means is designed as a spring, it can be arranged in particular in a lower section of the locking means, in particular in the lower section of the bolt, and can be wound around the lower section of the bolt, in particular in the form of a spiral spring. This results in a compact and secure design of the spring means and the locking means.

In a further preferred embodiment of the brake-lining retainer it is provided that the retaining part has a, in particular swallow-tailed, receiving guide for receiving a brake lining, in particular for receiving a back plate of a brake lining.

The brake lining or a back plate of the brake lining is guided via the preferred swallow-tailed receiving guide or guide track in the lining retainer or in the retaining part of the lining retainer. The brake lining is secured against loss by the movable closure bar. For guiding the brake lining or the back plate of the brake lining, the brake lining or the back plate has a guiding means, which is complementary to the receiving guide of the retaining part. In particular, the brake lining or the back plate of the brake lining has a swallow-tailed guide. The total length of the lining retainer and the retaining part of the lining retainer is chosen in such a way that the detached region of the swallow-tailed guide of the lining or the back plate of the lining can be locked by a retaining surface at the closure bar.

A further advantageous embodiment of the brake-lining retainer provides that the locking-means receptacle, in particular the blind hole, has a conical shape.

For locking the closure bar in the closure position, the preferably spring-loaded locking means, in particular the bolt, immerses into the conical locking-means receptacle. The diameter of the locking-means receptacle, in particular of the blind hole, decreases downwards in a conical manner. The particular conical design of the locking-means receptacle reduces the clearance of the locking means arranged in the locking-means receptacle in the closure position or the section of the locking means.

In a convenient development of the brake-lining retainer it is provided that the closure bar has at least one connecting arm for connecting the closure bar with the retaining part, in particular with a rib of the retaining part, that in at least one connecting arm a through-hole, in particular a through bore-hole, is arranged and that at least one connecting means is provided, which is arranged in the through-hole, wherein preferably at least one headed drill bush is arranged in the through-hole.

Conveniently, the brake-lining retainer and in particular the retaining part on the side facing away from the brake lining has at least one, preferably several, ribs, which are designed for reinforcing the brake-lining retainer. The geometric shape of the ribs of the lining retainer is particularly designed for a collision-free insertion into the inner wheel contour of a disk wheel. The ribs can also serve to transmit forces acting via a brake linkage to the brake-lining retainer, the brake lining and thus to the wheel brake disk of a track wheel.

A lower rib of the retaining part, which is located in the lower area of the retaining part, is preferably designed geometrically in such a way that a connection of the closure bar with the retaining part or the rib of the retaining part can occur, by means of the connecting arms of the closure bar. For this purpose, the closure bar preferably has at least one connecting arm, which can be arranged at the retaining part, preferably at a rib of the retaining part. Conveniently, a through-hole is inserted into the connecting arm, which is particularly preferably formed as a through bore-hole. The through-hole is aligned with a corresponding hole or bore at the retaining part or at the rib of the retaining part. For connecting the closure bar with the retaining part, a connecting means, in particular a connecting bolt is provided, which is particularly preferably arranged in the through-hole of the connecting arm of the closure bar and simultaneously is arranged in the aligned hole or bore of the retaining part. To reinforce the connection of the closure bar with the retaining part, at least one headed drill bush can be provided, which is arranged in the through-hole and/or in the bore or hole aligned in the retaining part. Particularly preferably, the closure bar is connected in the lower area of the retaining part of the lining retainer at an enlarging of a rib via one or two pins or connecting bolts and is rotatably mounted.

A further convenient embodiment of the brake-lining retainer is characterized in that the closure bar is pivotable about an axis of rotation extending through the through-hole.

A particularly preferred embodiment provides that the axis of rotation of the closure bar is arranged offset from the longitudinal axis of the locking means, that preferably the longitudinal axis and the axis of rotation are perpendicular to each other, wherein the longitudinal axis and the axis of rotation do not intersect, wherein in the opening position the intersection of the longitudinal axis of the locking means and the central axis of the locking-means receptacle is not located on the axis of rotation, wherein in the opening position the intersection of the longitudinal axis of the locking means and the central axis of the locking-means receptacle is preferably located in the region between the axis of rotation and the locking-means receptacle, in particular between the axis of rotation and a bottom of a blind hole.

Conveniently, the closure bar is therefore pivotably designed around an axis of rotation perpendicular to the longitudinal axis of the locking means. The axis of rotation is arranged offset with respect to the longitudinal axis of the locking means. The orthogonal distance of the axis of rotation from the longitudinal axis or the displacement of the axis of rotation from the longitudinal axis may be between 0.5 mm and 10 mm, preferably between 2 mm and 4 mm, most preferably 3 mm. It is preferably provided that the axis of rotation extends on that side of the longitudinal axis of the locking means which faces from the brake-lining arranged at the brake lining. The longitudinal axis and the axis of rotation are therefore mutually skewed. In the opening position of the closure bar the intersection of the longitudinal axis of the locking means and the central axis of locking-means receptacle is not located on the axis of rotation. This is achieved in particular by the skew displacement of the axis of rotation from the longitudinal axis in the direction of the side of the brake-lining retainer facing away from the brake lining. By the preferred displacement of the axis of rotation in the opening position of the closure bar the intersection of the longitudinal axis of the locking means and the central axis of the locking-means receptacle is located in the area between the axis of rotation and the locking-means receptacle. Here, the locking means receptacle is preferably designed as a blind hole. Accordingly, the intersection of the longitudinal axis and the central axis of the locking-means receptacle particularly preferably is located in the area between the axis of rotation and the bottom of the blind hole. In other words, if the brake-lining retainer is arranged at a wheel brake disk in such a way that the closure bar is located in the lower area of the brake-lining retainer, in the opening position the intersection of the longitudinal axis of the locking means and the central axis of the locking-means receptacle, seen in vertical direction, is located below the axis of rotation and preferably above the bottom of the blind hole. The displacement of the axis of rotation from the longitudinal axis of the locking-means receptacle advantageously enables the particularly spring-loaded locking means to abut to the closure bar in the opening position of the closure bar and, in particular due to the force exerted on the locking means by the spring means, to apply a torque on the closure bar with respect to the axis of rotation of the closure bar. In the opening position the locking means is not arranged in the locking-means receptacle. The action of force of the locking means onto an area of the closure bar different from the locking-means receptacle and the torque generated thereby causes a self-locking of the closure bar, so that it cannot be pivoted from the opening position into the closure position without releasing the self-locking.

Conveniently, it may be provided that the closure bar has a locking means resting surface, wherein the locking means in the opening position can be rested against the locking means resting surface with one end face, wherein preferably the locking means resting surface has an inclination relative to the locking-means receptacle, such that a surface normal of the locking means resting surface draws up an angle a with the central axis of the locking-means receptacle, wherein the angle a particularly preferably corresponds to the angle of rotation of the closure bar between the closure position and the opening position.

By resting the locking means against the locking means resting surface of the closure bar with an end face, a self-locking of the closure bar in the opening position of the closure bar is reached, respectively, a torque onto the closure bar is exerted by the locking means with respect to the axis of rotation of the closure bar. A pivoting of the closure bar from the opening position into the closure position can thus only be reached by releasing the self-locking. Particularly preferably, the axis of rotation of the closure bar is arranged offset to the longitudinal axis of the locking means, so that a particularly effective self-locking occurs and a particularly large torque is exerted on the closure bar. Here, the surface normal of the locking means resting surface has an angle with the central axis of the locking-means receptacle, wherein the angle particularly preferably corresponds to the angle of rotation of the closure bar between the closure and the opening position. This ensures that in the closure position of the closure bar a preferably lower section of the locking means can be inserted into the locking-means receptacle in a straight line.

In the closure position, the longitudinal axis of the locking means preferably is located on the central axis of the locking-means receptacle.

If the closure bar is pivoted from the closure position to the opening position by a pivoting angle corresponding to the angle of rotation of the closure bar between the closure position and the opening position, the locking means resting surface provided at the closure bar is also pivoted about the pivoting angle along with the closure bar. In the opening position of the closure bar a surface normal of the locking means resting surface is then aligned parallel with the longitudinal axis of the locking means. In the opening position, therefore the geometric locking means resting surface due to the rotation is aligned planar to an end face of the particularly spring-loaded locking means, respectively the bolt. Due to the particularly spring-loaded installation of the locking means at the locking means resting surface, the closure bar can be locked in its opening position by applying a torque to the closure bar, wherein a self-locking occurs.

A further preferred embodiment of the brake-lining retainer is characterized in that, in the opening position, a self-locking of the closure bar can be generated by resting the end face of the locking means against the locking means resting surface and by the displacement of the longitudinal axis of the locking means relative to the axis of rotation, wherein, particularly preferably the particularly spring-loaded locking means applies a torque to the closure bar which acts in the opening direction of the closure bar with respect to the axis of rotation.

By resting the locking means against the locking means resting surface in the opening position of the closure bar, in particular in conjunction with the preferred displacement of the axis of rotation of the closure bar with respect to the longitudinal axis of the locking means, a torque is applied to the closure bar, which causes the self-locking of the closure bar in the opening position.

In a further advantageous embodiment of the brake-lining retainer it is provided that the closure bar has a chamfer, wherein, in the opening position, the chamfer can be preferably rested against a chamfer resting surface of the retaining part, whereby over-rotation of the closure bar beyond the opening position can be prevented.

Therefore in the opening position a protection against over-rotation is given by the geometric design of the retaining part and the closure bar having a chamfer, which prevents the closure bar from over-rotating beyond the opening position. Preferably, for an unimpeded change of lining, the closure bar can be rotated by 10° to 30°, particularly preferably between 15° and 20°, particularly preferably by 17°. Further preferably, the chamfer may be arranged at the connecting arm, in order to support the defined angle of rotation and to prevent over-rotation.

Further preferably, a closure bar resting surface is arranged in the lower area at the retaining part of the brake-lining retainer. In particular preferably, the closure bar resting surface is adjacent to a rib of the retaining part, to which the closure bar can be fastened. In the closure position of the closure bar, the closure bar rests against the closure bar resting surface of the retaining part, so that the closure bar cannot be rotated beyond the closure position. If the closure bar is pivoted from the closure position into the opening position, the closure bar is pivoted away from the closure bar resting surface, wherein at the same time, however, the chamfer of the closure bar, which is arranged at the at least one connecting arm, moves toward the chamfer resting surface, since the chamfer in the brake-lining retainer arranged at a wheel brake disk is located above the axis of rotation of the closure bar. The closure bar can be pivoted in the direction of the opening position until the chamfer of the closure bar comes to rest with the chamfer resting surface of the retaining part of the brake-lining retainer. The chamfer resting surface may be a part of or a partial area of the closure bar resting surface of the retaining part. The surface of the chamfer preferably forms an angle with the longitudinal axis of the locking means, which corresponds to the rotation angle a of the closure bar between the opening position and the closure position.

In a convenient development of the brake-lining retainer it is provided that a releasing means guiding opening is arranged in a bottom of the locking-means receptacle, in particular in the bottom of the blind hole, wherein preferably a central axis of the releasing means guiding opening is arranged offset to the central axis of the locking-means receptacle, wherein the locking means is movable by a releasing means which can be conducted through the releasing means guiding opening, for example a screwdriver, in such a way that in the closure position the locking means can be pushed out of the locking-means receptacle, so that the locking of the closure bar in the closure position can be released and/or that in the opening position, the locking means can be pushed away from the locking means resting surface, so that the self-locking and/or the torque acting on the closure bar in the opening direction of the closure bar can be released.

The releasing means guiding opening, which is preferably arranged below the blind hole or the locking-means receptacle, serves as a guide for a tool, such as a screwdriver. Thus, the in particular spring-loaded bolt may be moved linearly and at the same time the closure bar can be tilted in order to release the blocking of both the closure position and the opening position. The releasing means, in particular the screwdriver, is inserted through the releasing means guiding opening from below into the locking-means receptacle, and a force can be exerted via the releasing means on the section of the locking means, which, in the closure position, is arranged in the locking-means receptacle. If the closure bar is in the closure position, the spring loaded bolt can be shifted in its longitudinal axis for opening the closure bar, wherein the releasing means can be used for the shifting. For the movement of the locking means, the releasing means may thus be used. By means of the releasing means, the locking means can be pushed out of the locking-means receptacle. If the locking means is pushed out of the locking-means receptacle, the closure bar can be set in the opening position by a tilting movement of the releasing means or of the closure bar, transversely to the longitudinal axis of the locking means. If the releasing means is released from the releasing means guiding opening, the locking means, preferably with an end face of the locking means, is rested against the planar locking means resting surface in the closure bar, in particular by the spring force of the spring means, and by the self-locking generated thereby the closure bar is held in the opening position. The releasing means guiding opening preferably constitutes a linear guiding for the releasing means.

In the opening position of the closure bar, the change of the brake lining can take place. Due to the spring load and the position of the longitudinal axis of the locking means to the planar locking means resting surface as well as to the axis of rotation of the closure bar, a self-locking is achieved. This deliberately generated resistance between two components can be released again only by an external force application and then the closure bar is pivoted back into the closure position. The purposeful external force application, on the other hand, may take place with a releasing means, which is introduced into the locking-means receptacle through the releasing means guiding opening. Since preferably, in the opening position of the closure bar, the locking means rests against the locking means resting surface only with a part of an end face of the locking means and with another part of the end face of the locking means at least partially still protrudes into the locking-means receptacle, via the releasing means inserted into the locking-means receptacle through the releasing means guiding opening a force can be exerted onto the locking means, in particular onto the end face of the locking means, so that the locking means moves away from the locking means resting surface of the closure bar. By removing the locking means from the locking means resting surface of the closure bar, the self-locking is released, so that by pivoting, preferably of the release means, the closure bar can be pivoted from the opening position into the closure position.

The closure bar is thus retained via a preferably spring-loaded bolt. The locking means or the bolt simultaneously serves as a connecting element between the brake lever and the brake-lining retainer.

A further preferred embodiment of the brake-lining retainer is provided in that the closure bar has a retaining surface, wherein in the closure position a brake lining arranged in the receiving guide of the retaining part, in particular a back plate of a brake lining, can be rested against the retaining surface in such a way that the brake lining, in particular the back plate of the brake lining, in the closure position is secured or locked in the receiving guide.

The retaining surface for the brake lining, in particular for the back plate of the brake lining, is arranged on a side of the closure bar facing the brake lining. Preferably, the retaining surface is oriented parallel to the bottom of a locking-means receptacle formed as a blind hole. If, in the opening position, a brake lining or a back plate of a brake lining is inserted into the receiving guide of the retaining part, the closure bar can be pivoted from the opening position into the closure position by releasing the self-locking of the closure bar, after the pad has been fully inserted into the receiving guide. The closure bar is designed in such a way that, if the brake-lining retainer is arranged at a wheel brake disk, the retaining surface of the closure bar, seen in a vertical direction, engages behind the brake lining or the back plate of the brake lining from below and thus blocks the brake lining against falling down. The brake lining or the back plate of the brake lining is positively secured or retained in the brake-lining retainer in the closure position by the receiving guide of the lining part and the retaining surface of the closure bar.

An advantageous development of the brake-lining retainer is provided in that the closure bar has a lining resting surface for resting a lining back of a brake lining arranged in the receiving guide.

The lining resting surface of the closure bar provides a resting surface for the lining back of brake linings. By this, a possible gap is additionally countervailed.

The lining resting surface is preferably aligned perpendicular to the retaining surface of the closure bar and parallel to the central axis of the locking-means receptacle. Further preferably, the area of the lining resting surface is between 200 cm$^2$ and 600 cm$^2$, preferably between 300 cm$^2$ and 500 cm$^2$, most preferably between 350 cm$^2$ and 450 cm$^2$.

In a particularly preferred embodiment of the brake-lining retainer it is provided that the locking means, in particular the bolt, has a recess, preferably a blind hole, wherein preferably the recess is arranged in an end face of the locking means.

Advantageously, the recess or the geometric recess, preferably the blind hole, is designed for receiving a free end of a releasing means, in particular a standard tool such as a screwdriver or turnscrew. Thus, the releasing means can be guided through the releasing means guiding opening in the closure position and/or in the opening position of the closure bar, wherein the free end of the releasing means immerges into the recess of the locking means. This allows a particularly safe way to transfer to the locking means the force which is necessary for releasing the self-locking of the closure bar in the opening position or which is necessary for moving the locking means from the locking-means receptacle in the closure position. Further, during the pivoting of the closure bar between the opening position and the closure position, the free end of the locking means, which is guided through the releasing means guiding opening of the closure bar, may remain in the recess of the locking means. This enables a guided pivoting of the closure bar, with a simultaneous uninterruptible power transmission to the locking means. Particularly preferably, the recess is arranged in the end face of the locking means. Further preferably, the recess is arranged centrally in the end face of the locking means. However, the recess may also be arranged in the locking means in such a way that the recess is aligned with the releasing means guiding opening of the closure bar, if the locking means is arranged in the locking-means receptacle. The recess may be a blind hole or a cylindrical recess, however, a cone or dome-shaped recess is conceivable, as well.

A further solution to the problem on which the invention is based is provided by a method for securing a brake lining in a brake-lining retainer.

In the method according to the invention for securing a brake lining in a brake-lining retainer, in particular according to one of the embodiments described above, it is provided that a brake lining is arranged in a, in particular swallow-tailed receiving guide of a retaining part of the brake-lining retainer, wherein a closure bar arranged at the retaining part is pivoted from the opening position to a closure position, wherein a locking means, in particular a bolt, is displaced in the direction of the longitudinal axis of the locking means in such a way that at least a section of the locking means is arranged in a locking-means receptacle of the closure bar, so that the closure bar is locked in the closure position.

By the method according to the invention, retainer of a brake lining is achieved, which is free of collisions with the wheel contour in all specified operating conditions. Further, in the retainer a closure bar of the brake-lining retainer can be opened and closed with a standard tool by means of one-handed operation.

BRIEF DESCRIPTION OF DRAWINGS

An embodiment of the invention is explained below with reference to the drawings.

DETAILED DESCRIPTION OF THE PREFERRED EMBODIMENTS OF THE INVENTION

Figure 1:
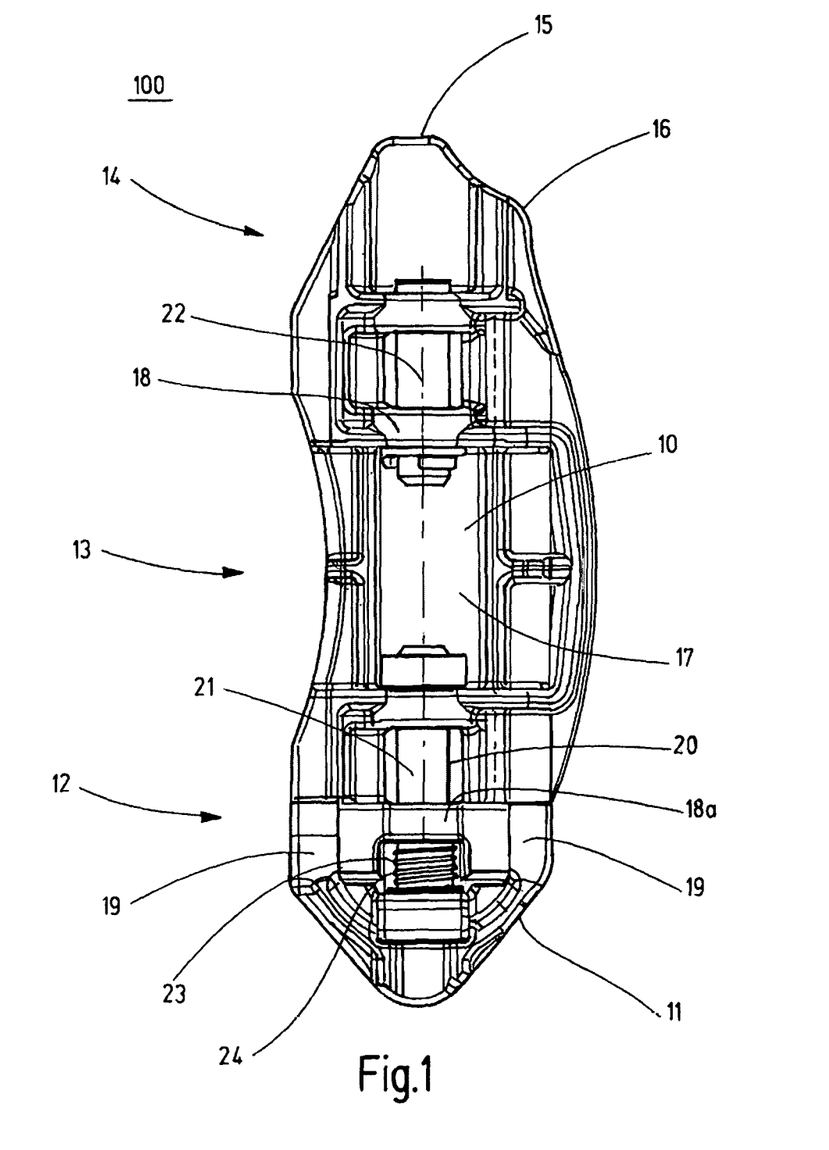
FIG. 1 shows a plan view of the top side of a brake-lining retainer.

FIG. 1 shows a plan view of a brake-lining retainer 100 in accordance with the invention. The brake-lining retainer 100 has a retaining part 10 as well as a closure bar 11. If the brake-lining retainer 100 is arranged at a wheel brake disk of a rail vehicle, the closure bar 11 in positioned a lower area 12 of the brake-lining retainer 100. The brake-lining retainer 100 has an elongated shape, wherein a middle area 13 of the brake-lining retainer 100 in the plan view has approximately the shape of a ring segment. The shape of the ring segment preferably corresponds to a ring segment of a wheel brake disk, at which the lining retainer can be arranged. In an upper area 14, the brake-lining retainer 100 has a roughly triangular or pointed design. The upper tip 15 of the upper area 14 of the brake-lining retainer 100 is formed blunted. Further, on one edge of the upper area 14 of the brake-lining retainer 100 there is a bulge 16. The lower area 12 of the brake-lining retainer 100 is formed by the closure bar 11, which also has an approximately triangular or pointed shape. On the side or surface facing away from the wheel brake disk, or on the top side 17, ribs 18 are arranged for reinforcing the retaining part 10 of the brake-lining retainer 100. The closure bar 11 is pivotably arranged at a reinforced rib 18a in the lower area 12 of the retaining part 10 via two connecting arms 19 at the retaining part 10 of the brake-lining retainer 100. The geometric contour of the brake-lining retainer 100 is designed for a collision-free penetration into the inner wheel contour of a railway wheel. The embodiment thus prevents damage to the brake-lining retainer 100 and thus to the braking system in all specified operating conditions. In the lower area 12 of the brake-lining retainer 100, the brake-lining retainer 100 has a locking means 21 formed as a first bolt 20. A second bolt 22 is arranged above the first bolt 20, seen in the vertical direction. The first bolt 20 and second bolt 22 simultaneously serve as a connecting element between the brake lever of a brake linkage and the brake-lining retainer 100.

The first bolt 20 is spring-loaded with a spring 23. The turns of spring 23 are wound or twisted around the lower section 24 of the first bolt 20, and exert a preload on the first bolt 20 downwards in the direction of the closure bar 11, seen in the vertical direction.

Figure 2A:
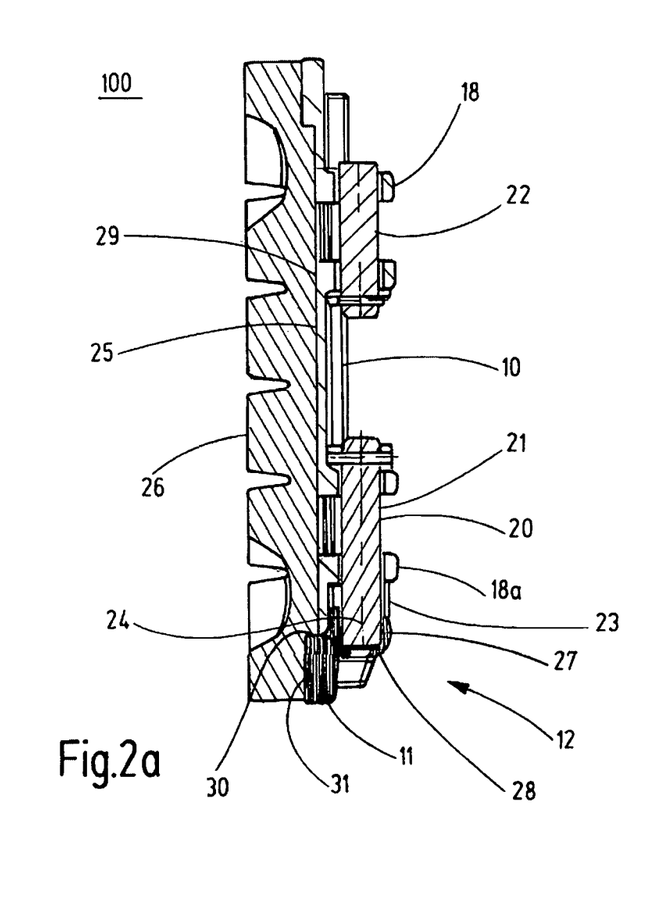
FIG. 2a shows a side view of the brake-lining retainer in the closure position.
Figure 2B:
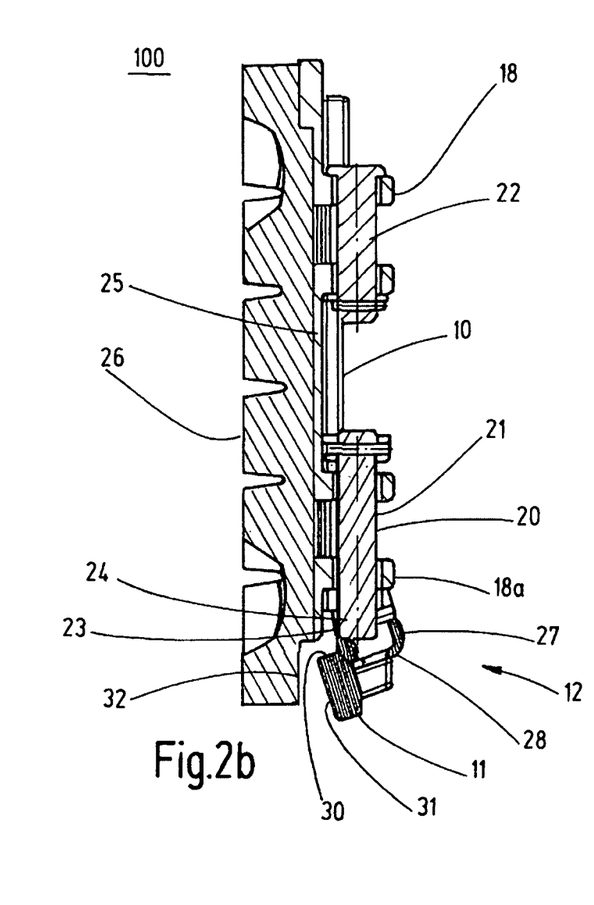
FIG. 2b shows a side view of the brake lining retainer in the opening position.

FIGS. 2a and 2b show a side view of the brake-lining retainer 100. FIG. 2a shows the closure bar 11 in a closure position. FIG. 2b shows the closure bar 11 in an opening position. The retaining part 10 of the brake-lining retainer 100 is reinforced with ribs 18. A brake lining 26 is attached on the first side 25 facing a wheel brake disk. In the lower area 12 of the brake-lining retainer 100, the closure bar 11 is pivotably mounted to the retaining part 10. The closure bar 11 has a locking-means receptacle 27 which is designed as a blind hole 28. In the closure position, the first bolt 20 is arranged in the blind hole 28 with a lower section 24 of the bolt. The lower section 24 of the first bolt 20 is retained spring-loaded in the blind hole 28 by the resilience of the spring 23. By the positive engagement of the lower section 24 of the first bolt 20 into the blind hole 28 of the closure bar 11, the closure bar 11 is locked in the closure position.

The brake lining 26 has a back plate 29. In the closure position of the closure bar 11, the back plate 29 rests against a retaining surface 30 and is captively retained at the retaining part 10 of the brake-lining retainer 100 by engaging behind the back plate 29 by the retaining surface 30. Further, in FIG. 2 a brake-lining resting surface 31 is shown, against which the brake linings 26 rests with a part of the lining back 32. Via the brake-lining resting surface 31, a possible gap of the brake lining 26 is countervailed.

Figure 3A:
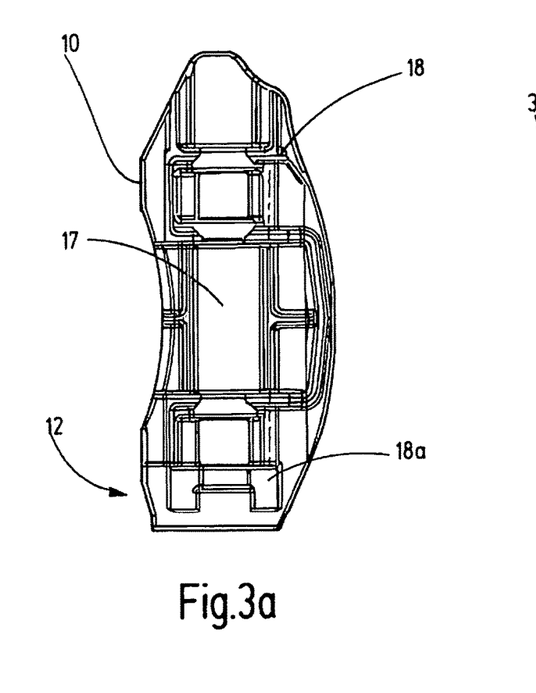
FIG. 3a shows a plan view of the top side of the brake-lining retainer.
Figure 3B:
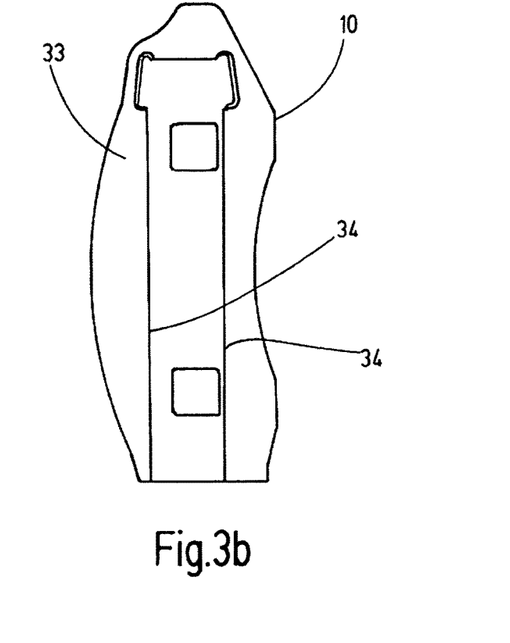
FIG. 3b shows a plan view of the rear side of the brake-lining retainer.
Figure 11:
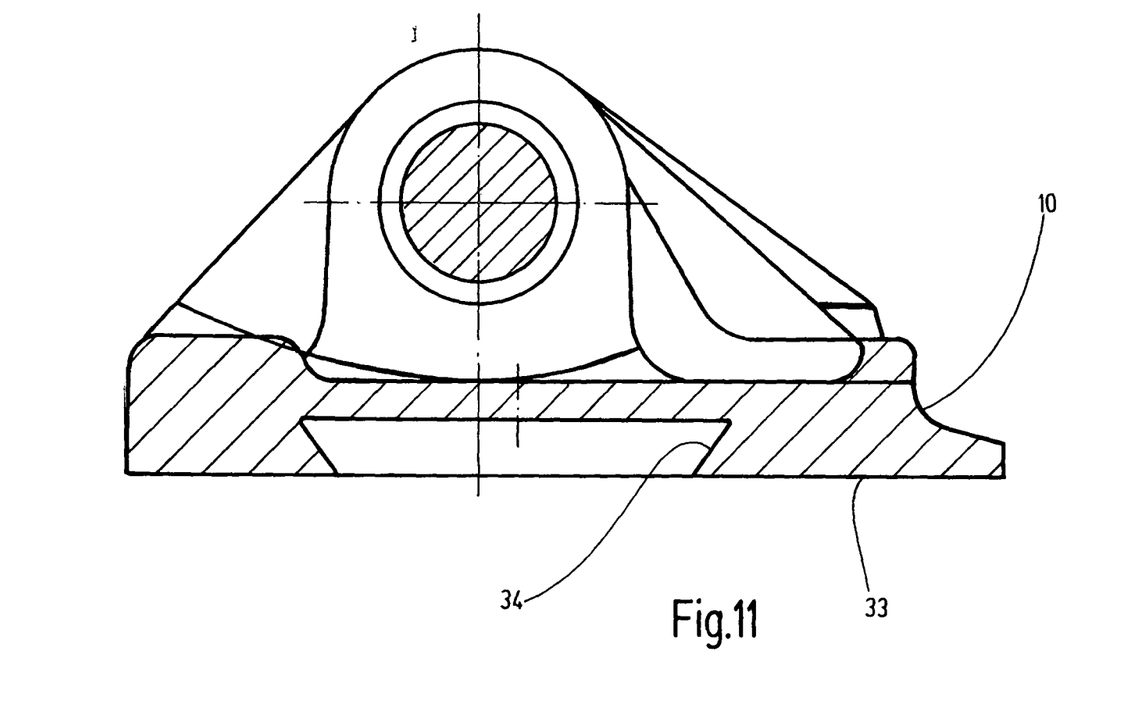
FIG. 11 is a cross-sectional side view of the retaining part shown in FIGS. 3a and 3b.

FIGS. 3a and 3b and 11 show the retaining part 10 of the brake-lining retainer 100. FIG. 3a shows the top side 17 of the brake-lining retainer comprising ribs 18. FIG. 3b shows the back side 33 of the brake-lining retainer 100. FIG. 11 shows a cross-sectional side view of retaining part 10 of brake-lining retainer 100. On the back side 33 of the brake-lining retainer 100, a receiving guide 34 is located for receiving the brake lining 26 or the back plate 29 of the brake lining 26. For retaining the brake lining 26 in the retaining part 10 of brake-lining retainer 100, the back plate 29 of the brake lining 26 has a swallow-tailed guiding device (not shown), which can be inserted into the complementarily configured receiving guide 34 of the retaining part 10 of the brake-lining retainer 100 shown in FIG. 11.

Figure 4A:
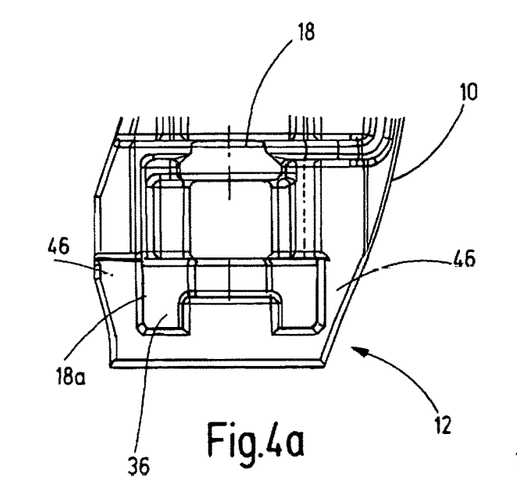
FIG. 4a shows a plan view of the lower area of the brake-lining retainer
Figure 4B:
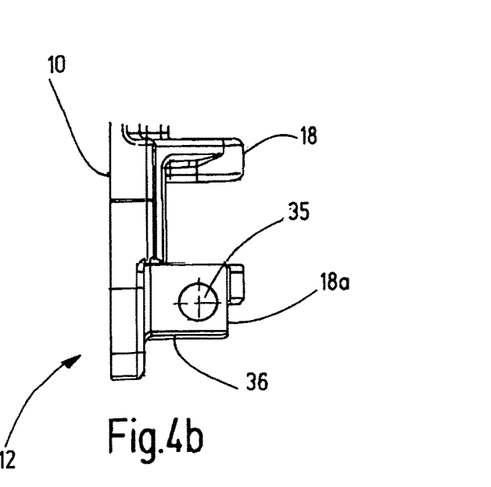
FIG. 4b shows a side view of the lower area of the brake-lining retainer.

FIG. 4a shows the lower area 12 of the retaining part 10 of the brake-lining retainer 100 in a plan view. FIG. 4b shows the lower part 12 of the retaining part 10 in a side view. The lower area 12 of the retaining part 10 has reinforced ribs 18a. The reinforced ribs 18a are formed for receiving the closure bar 11. In the reinforced rib 18a, a rib bore 35 has been introduced. The reinforced rib 18a is formed as a connecting rib 36. On both sides of the connecting rib 36 a closure bar resting surface 46 is formed, against which the closure bar 11 rests in the closure position.

Figure 5:
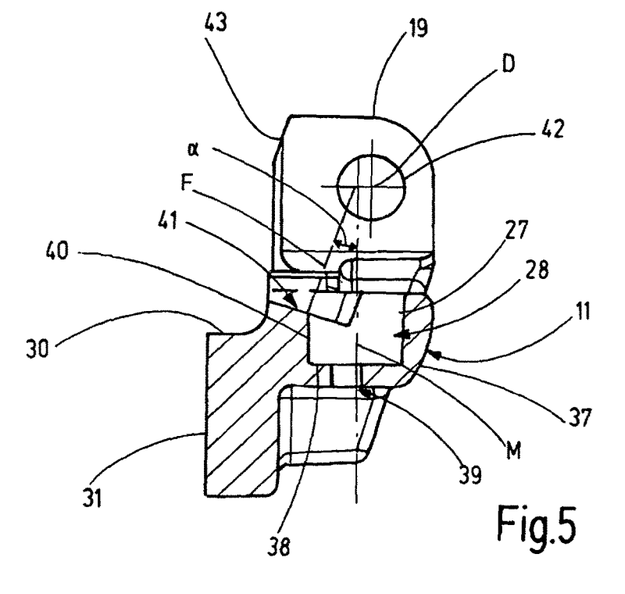
FIG. 5 shows a side view of a closure bar.

FIG. 5 shows an embodiment of the closure bar 11. The closure bar 11 has a block 37. The closure bar 11 may be manufactured in a casting or forging technique. Additionally, the closure bar 11 can also be mechanically reworked. In the block 37 of the closure bar 11 a locking-means receptacle 27 is arranged, which is formed as a blind hole 28. The blind hole 28 has a bottom 38, which is aligned perpendicular to a central axis M of the blind hole 28. In the bottom 38 of the blind hole 28 a releasing means guiding opening 39 is located, through which a standard tool, such as a screwdriver, can be guided in a linear guide. The releasing means guiding opening 39 is arranged offset from the central axis M of the blind hole 28 in the bottom 38 of the blind hole 28. Laterally offset, respectively in a side wall 40 of the blind hole 28, a locking means resting surface 41 is formed. A surface normal F of the locking means resting surface 41 forms an angle a with the central axis M of the blind hole 28, wherein the value of the angle a corresponds to the angle of rotation of the closure bar 11 between the opening position and the closure position. For retaining a brake lining 26, a retaining surface 30 is arranged at the block 27. The retaining surface 30 is aligned approximately parallel to the bottom 38 of the blind hole 28. Approximately perpendicular to the retaining surface 30 of the block 37, a brake lining resting surface 31 is provided, against which a brake lining 26 arranged in the retaining part 10 of the brake-lining retainer 100 may be rested with a lining back side 32. Above the block 37, at least two connecting arms 19 are located at the closure bar 11 for connecting the closure bar 11 with the retaining part 10 of the brake-lining retainer 100. A through bore-hole 42 is introduced in the connecting arm 19 of the closure bar 11. If the closure bar 11 is arranged at the retaining part 10, the closure bar 11 can be connected to the retaining part 10 through the through bore-hole 42 and the rib bore 35 by means of connecting bolt not shown in FIG. 5. The closure bar 11 is pivotable about an axis of rotation D extending through the through bore-hole 42 or through the aligned rib bore 35 relative to the retaining part 10 of the brake-lining retainer 100.

At the connecting arm 19 of the closure bar 11, a chamfer 43 is arranged, which supports a defined rotational angle and thus prevents an over-rotation of the closure bar 11.

Figure 6:
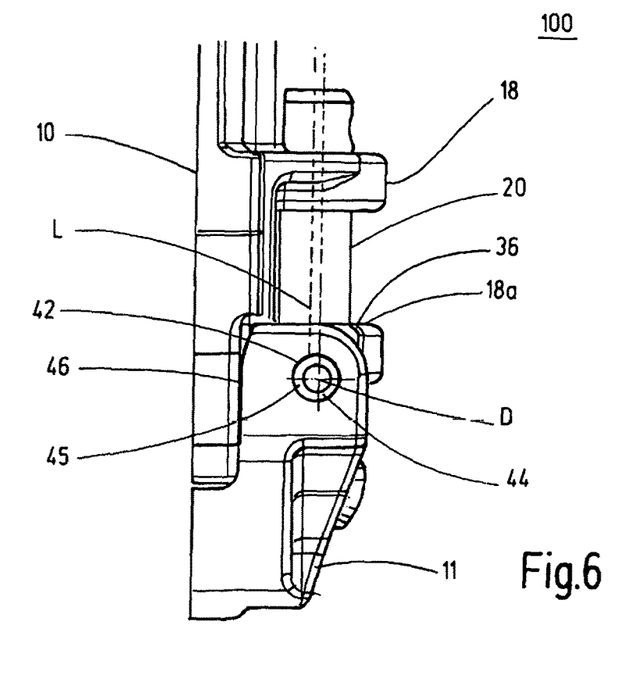
FIG. 6 shows a side view of the closure bar arranged at a retaining part of the brake-lining retainer.

FIG. 6 shows a side view of the closure bar 11 arranged at the retaining part 10. The closure bar 11 is attached to the connecting rib 36 of the retaining part 10 via connecting bolts 44. To reinforce the connection, a headed drill bush 45 is inserted into the through bore-hole 42 of the closure bar 11. In the closure position of the closure bar 11 shown in FIG. 6, the closure bar 11 rests against a closure bar resting surface 46 of the retaining part 10, whereby over-rotation from the closure position of the closure bar 11 is prevented. The axis of rotation D of the closure bar 11 is arranged offset from the longitudinal axis L of the first bolt 20. The displacement of the axis of rotation D can be 3 mm.

Figure 7:
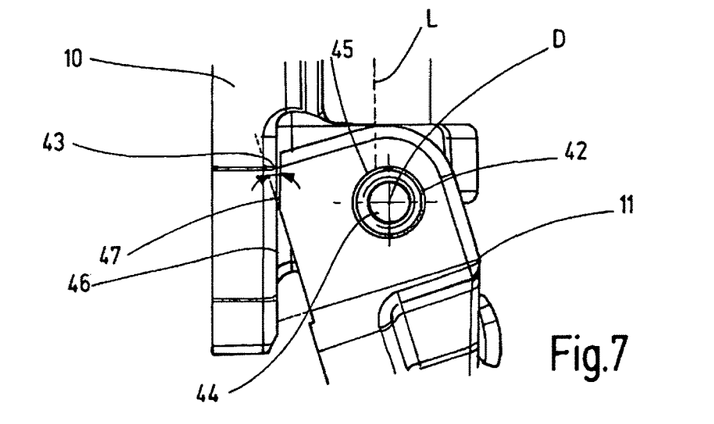
FIG. 7 shows a detailed drawing of the connection of the closure bar to the retaining part of the brake-lining retainer.

FIG. 7 shows a detailed view of the connection between the closure bar 11 and the retaining part 10. The opening position of the closure bar 11 is shown here. In the opening position of the closure bar 11, the closure bar 11 with the chamfer 43 rests against a chamfer resting surface 47 of the retaining part 10. The chamfer resting surface 47 is part of the closure bar resting surface 46 of the retaining part 10. By resting the chamfer 43 of the closure bar 11 against the chamfer resting surface 47 of the retaining part 10, an over-rotation of the closure bar 11 beyond the opening position is prevented.

Figure 8A:
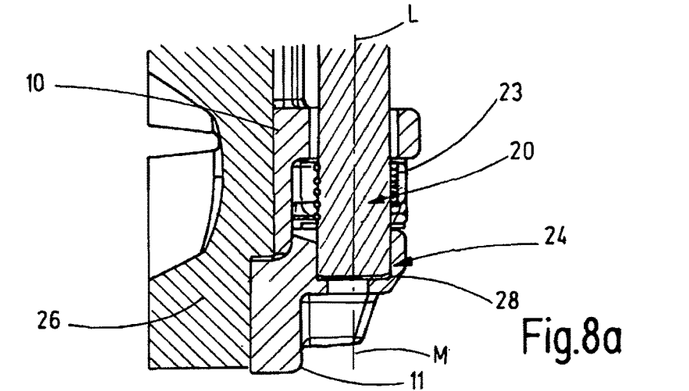
FIG. 8a shows the closure bar in the closure position.
Figure 8B:
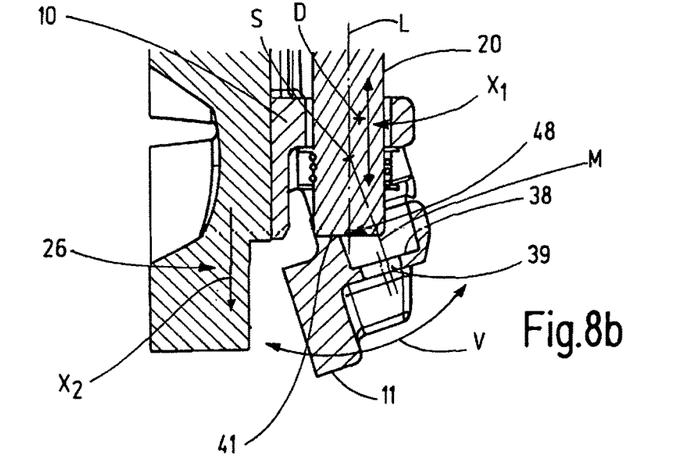
FIG. 8b shows the closure bar in the opening position.

In FIGS. 8*a* and 8*b* the brake-lining retainer 100 is shown in the closure position of the closure bar 11 (FIG. 8*a*) and in the opening position of the closure bar 11 (FIG. 8*b*). In the closure position of the closure bar 11 shown in FIG. 8*a*, the first bolt 20 is aligned centrally to the central axis M of the blind hole 28 and arranged with a lower section 24 in the blind hole 28. The bolt 20 is loaded by a spring 23 and thus retained in the blind hole 28. The positive connection of the bolt 20 with the blind hole 28 ensures a secure locking of the closure bar 11 in the closure position. The longitudinal axis L of the spring loaded bolt 20 is arranged offset to the axis of rotation D of the closure bar 11.

For pivoting the closure bar 11 in the opening position shown in FIG. 8*b* is done the following. Through the releasing means guiding opening 39 in the bottom 38 of the blind hole 28, a standard tool, such as a screwdriver, can be introduced. By means of the screwdriver, a force can be exerted on the spring-loaded bolt 20, so that it can be displaced in the direction of its longitudinal axis L. The direction of displacement is indicated by the arrow labeled X1. If the lower section 24 of the spring-loaded bolt 20 is pushed out of the blind hole 28, the closure bar 11 can be pivoted in the pivoting direction V from the closure position into the opening position by pivoting the screwdriver or the release means, as the closure bar 11 is no longer locked by the bolt 20. If the closure bar 11 is in the opening position, the releasing means or the screwdriver is pulled out of the releasing means guiding opening 39. Due to the spring load of the bolt 20, the bolt 20 moves downwards again in the direction of the closure bar 11 and with an end face 48 rests against the locking means resting surface 41 of the closure bar 11. Due to the displacement of the axis of rotation D of the closure bar 11 relative to the longitudinal axis L of the spring-loaded bolt 20, the spring loaded bolt 20 exerts a torque on the closure bar 11 via the locking means resting surface 41 with respect to the axis of rotation D. By this, a self-locking of the closure bar 11 is obtained, so that the latter cannot be pivoted back into the closure position without releasing the self-locking. By the self-locking, the closure bar 11 is thus secured against torsion in the opening position. In the opening position, the brake lining 26 can be changed by removing the brake lining in the direction of the arrow marked with X2 or can be removed from the retaining part 10, or a new brake lining 26 can be inserted into the retaining part 10. For releasing the self-locking, a screwdriver can be inserted into the releasing means guiding opening 39 and a force that counteracts the spring tension of the spring 23 may be exerted on the spring-loaded bolt 20. By this, the spring-loaded bolt 20 is moved along its longitudinal axis L in the direction of X1, so that the end surface 48 of the bolt 20 moves away from the locking means resting surface 41. Then no torque is exerted any longer on the closure bar via the locking means resting surface 41, so that the closure bar 11 can be pivoted from the opening position into the closure position by pivoting the screwdriver arranged in the releasing means guiding opening 39.

To ensure that the torque causing the self-locking acts on the closure bar 11 in the direction of the opening position, the axis of rotation D of the closure bar 11 relative to the longitudinal axis L of the bolt 20 is arranged in such a way that the axis of rotation is located on the side of the longitudinal axis L of the bolt 20 facing away from the brake lining 26. In other words, in the opening position of the closure bar 11, the point of intersection S of the center axis M of the blind hole 28 with the longitudinal axis L of the spring-loaded bolt 20 is located below the axis of rotation D, or between the axis of rotation D and the bottom of the blind hole 28. The term below is in this context to be understood in such a way that, if the brake-lining retainer 100 is arranged at the wheel brake disk, the closure bar 11 is located in the lower area 12 of the brake-lining retainer 100. In the opening position, the intersection point S of the center axis M of the blind hole 28 with the longitudinal axis L of the bolt 20, vertically seen, is thus arranged below the axis of rotation D.

Figure 9A:
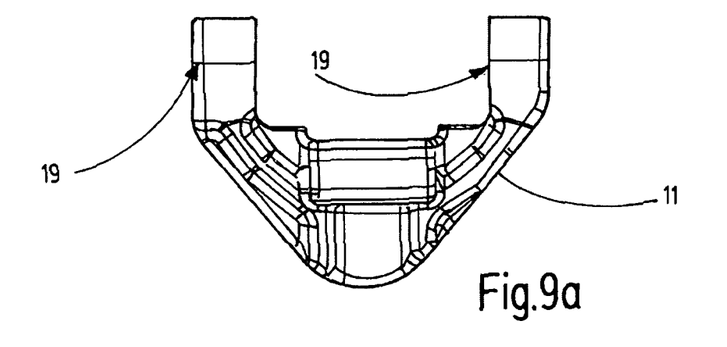
FIG. 9a shows a plan view of the top side of the closure bar.
Figure 9B:
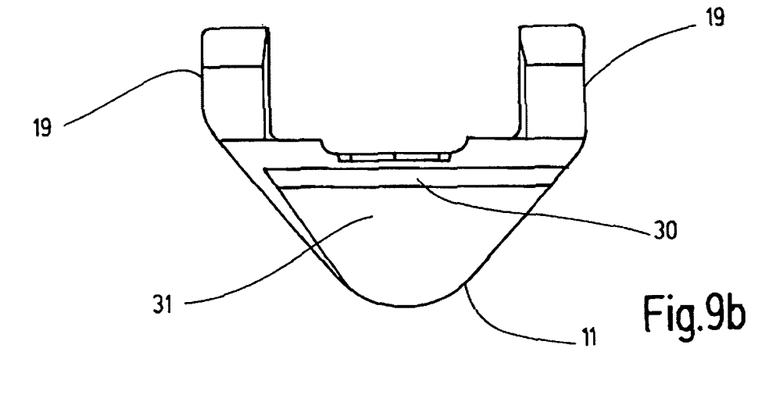
FIG. 9b shows a plan view of the bottom side of the closure bar.

FIGS. 9*a* and 9*b* show the top side and the bottom side of the closure bar 11. FIG. 9*b* shows the retaining surface 30 for the back plate 29 of a brake lining 26 as well as the brake-lining resting surface 31.

Figure 10:
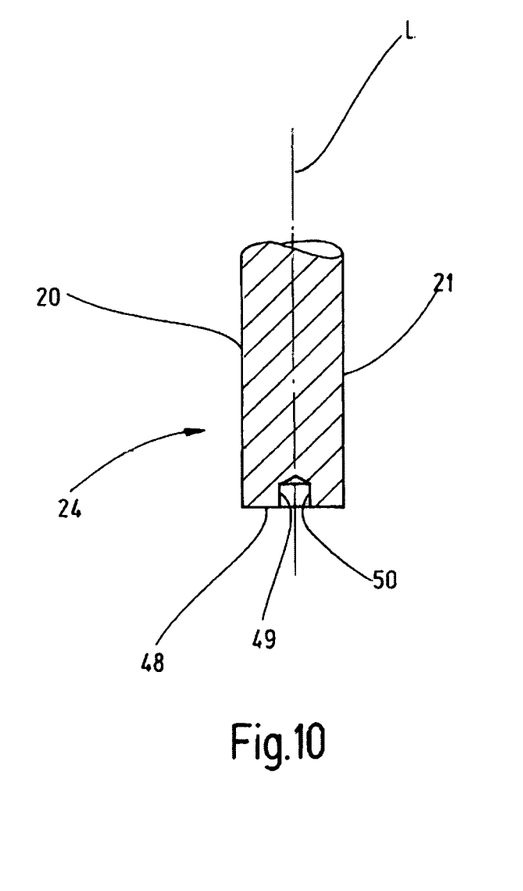
FIG. 10 shows a lower section of a locking means designed as a bolt.

FIG. 10 shows the lower section 24 of the locking means 21 formed as a first bolt 20. In the end face 48 of the first bolt 20, a geometric recess 49 is arranged, which is configured for receiving a free end of a releasing means. The releasing means is for example a standard tool, such as a screwdriver. The recess 49 has the shape of a blind hole 50. In the illustrated embodiment, the recess 49 is aligned centrally to the longitudinal axis L of the bolt 20. However, the recess may also be arranged offset to the longitudinal axis L of the bolt 20.

The invention claimed is:

1. A brake-lining retainer for wheel brake disks of rail vehicles, comprising a retaining part and a closure bar, characterized in that the brake-lining retainer has a locking means, wherein the locking means can be displaced in the direction of a longitudinal axis (L) of the locking means, that the closure bar is arranged at the retaining part and pivotable about an axis between a closure position and an opening position, and that the closure bar has a locking-means receptacle, wherein, in the closure position of the closure bar, by moving the locking means in the direction of the longitudinal axis (L) of the locking means, at least a section of the locking means can be arranged in the locking-means receptacle in such a way that the closure bar can be locked in the closure position, the closure bar having a locking means resting surface, wherein the locking means in the opening position with an end face can be rested against the locking means resting surface, wherein the locking means resting surface has an inclination relative to the locking-means receptacle, such that a surface normal (F) of the locking means resting surface encloses an angle ($\alpha$) with a central axis (M) of the locking-means receptacle, wherein the angle ($\alpha$) corresponds to the angle of rotation of the closure bar between the closure position and the opening position.

2. The brake-lining retainer according to claim 1, characterized in that the locking means is a bolt.

3. The brake-lining retainer according to either of claim 1 or 2, characterized in that the brake-lining retainer has a spring means, and that the locking means is spring-loaded by the spring means.

4. The brake-lining retainer according to either of claim 1 or 2, characterized in that the retaining part has a receiving guide for receiving a brake lining.

5. The brake-lining retainer according to either of claim 1 or 2, characterized in that the locking-means receptacle has a conical shape.

6. The brake-lining retainer according to claim 1, characterized in that the closure bar has at least one connecting arm for connecting the closure bar with the retaining part, that in the at least one connecting arm a through hole is arranged, and that at least one connecting means is provided, which is arranged in the through hole.

7. The brake-lining retainer according to claim 6, characterized in that the closure bar is pivotable about an axis of rotation (D) extending through the through hole.

8. The brake-lining retainer according to claim 7, characterized in that the axis of rotation (D) of the closure bar is arranged offset from the longitudinal axis (L) of the locking means, that the longitudinal axis (L) and the axis of rotation (D) are perpendicular to each other, wherein the longitudinal axis (L) and the axis of rotation (D) do not intersect, wherein, in the opening position, a point of intersection (S) of the longitudinal axis (L) of the locking means and the central axis (M) of the locking-means receptacle is not located on the axis of rotation (D).

9. The brake-lining retainer according to claim 8, characterized in that in the opening position, the point of intersection (S) of the longitudinal axis (L) of the locking means and the central axis (M) of the locking-means receptacle is located in the region between the axis of rotation (D) and the locking-means receptacle.

10. The brake-lining retainer according to claim 1, characterized in that, in the opening position, by resting the end face of the locking means against the locking means resting surface and by displacing the longitudinal axis (L) of the locking means relative to an axis of rotation (D) of the closure bar, a self-locking of the closure bar can be achieved, wherein the locking means exerts a torque acting on the closure bar in the opening direction of the closure bar with respect to the axis of rotation (D).

11. The brake-lining retainer according to either of claim 1 or 2, characterized in that the closure bar has a chamfer, wherein, in the opening position, the chamfer can be rested against a chamfer resting surface of the retaining part, which can prevent an over-rotation of the closure bar beyond the opening position.

12. The brake-lining retainer according to either of claim 1 or 2, characterized in that in a bottom of the locking-means receptacle a releasing means guiding opening is arranged, wherein preferably a central axis (Z) of the releasing means guiding opening is arranged offset to the central axis (M) of the locking-means receptacle, wherein the locking means can be displaced by means of a releasing means which can be guided through the releasing means guiding opening in such a way that, at least one of: in the closure position, the locking means can be pushed out of the locking-means receptacle, so that the locking of the closure bar in the closure position can be released, or that, in the opening position, the locking means can be pushed away from the locking means resting surface, so that a self-locking or a torque acting on the closure bar in the opening direction of the closure bar can be released.

13. The brake-lining retainer according to claim 4, characterized in that the closure bar has a retaining surface, wherein, in the closure position, the brake lining arranged in the receiving guide of the retaining part can be rested against the retaining surface in such a way that the brake lining in the closure position is secured or locked in the receiving guide.

14. The brake-lining retainer according to claim 4, characterized in that the closure bar has a brake lining resting surface for resting a lining back side of the brake lining arranged in the receiving guide.

15. The brake-lining retainer according to either of claim 1 or 2, characterized in that the locking means has a recess, wherein the recess is arranged in the end face of the locking means.

16. The brake-lining retainer according to claim 12, characterized in that the releasing means is a screwdriver.

17. The brake-lining retainer according to claim 15, characterized in that the recess is a blind hole.

18. A method for securing a brake lining in a brake-lining retainer, wherein a closure bar arranged at a retaining part of the brake-lining is in an opening position, wherein the closure bar comprises a locking-means receptacle, wherein the closure bar has a locking means resting surface, wherein a locking means in the opening position rests with an end face against the locking means resting surface, wherein the locking means resting surface has an inclination relative to the locking-means receptacle, such that a surface normal (F) of the locking means resting surface encloses an angle ($\alpha$) with a central axis (M) of the locking-means receptacle, wherein the angle ($\alpha$) corresponds to an angle of rotation of the closure bar between a closure position and the opening position, wherein the brake lining is arranged in a receiving guide of the retaining part of the brake-lining retainer, wherein the closure bar is pivoted from the opening position into the closing position, wherein the locking means is displaced in the direction of a longitudinal axis (L) of the locking means in such a way that at least a section of the locking means is arranged in the locking-means receptacle of the closure bar, so that the closure bar is locked in the closure position.

* * * * *